United States Patent
Xu et al.

(10) Patent No.: US 12,309,847 B2
(45) Date of Patent: *May 20, 2025

(54) DOWNLINK RADIO RESOURCE CONTROL MESSAGE TRANSMISSION IN 2-STEP RANDOM ACCESS

(71) Applicant: Apple Inc., Cupertino, CA (US)

(72) Inventors: Fangli Xu, Beijing (CN); Haijing Hu, Beijing (CN); Yuqin Chen, Beijing (CN); Dawei Zhang, Saratoga, CA (US); Wei Zeng, San Diego, CA (US); Haitong Sun, Irvine, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,584

(22) Filed: Jun. 27, 2023

(65) Prior Publication Data
US 2023/0345545 A1 Oct. 26, 2023

Related U.S. Application Data

(63) Continuation of application No. 17/573,413, filed on Jan. 11, 2022, now Pat. No. 11,737,148, which is a
(Continued)

(30) Foreign Application Priority Data
Aug. 13, 2019 (CN) .......................... 201910745594.1

(51) Int. Cl.
*H04W 74/0833* (2024.01)
*H04L 5/00* (2006.01)
(Continued)

(52) U.S. Cl.
CPC ....... *H04W 74/0833* (2013.01); *H04L 5/0055* (2013.01); *H04W 76/11* (2018.02); *H04W 76/27* (2018.02); *H04W 80/02* (2013.01)

(58) Field of Classification Search
CPC . H04W 74/0833; H04W 76/11; H04W 76/27; H04W 80/02; H04L 5/0055
See application file for complete search history.

(56) References Cited

U.S. PATENT DOCUMENTS 11,265,925 B2 * 3/2022 Xu .......................... H04W 76/11
11,737,148 B2 * 8/2023 Xu .......................... H04L 5/0055
370/329

(Continued)

FOREIGN PATENT DOCUMENTS

| CN | 106105366 | 11/2016 |
| CN | 109600843 | 4/2019 |

(Continued)

OTHER PUBLICATIONS

Nokia et al. "On 2-Step RACH Procedure"; 3GPP TSG RAN WG1 #97 R1-190747; May 13, 2019.
(Continued)

*Primary Examiner* — Michael J Moore, Jr.
(74) *Attorney, Agent, or Firm* — Kowert, Hood, Munyon, Rankin & Goetzel, P.C.

(57) ABSTRACT

Apparatuses, systems, and methods for a wireless device to perform 2-step random access procedures. The disclosure identifies techniques for transmitting and receiving downlink connection configuration information, such as a radio resource control message, in a 2-step random access procedure.

20 Claims, 12 Drawing Sheets

Related U.S. Application Data continuation of application No. 16/885,937, filed on May 28, 2020, now Pat. No. 11,265,925.

(51) Int. Cl.
  *H04W 76/11* (2018.01)
  *H04W 76/27* (2018.01)
  *H04W 80/02* (2009.01)

(56) References Cited

U.S. PATENT DOCUMENTS

| | | | |
|---|---|---|---|
| 2016/0309518 A1* | 10/2016 | Patel | H04W 74/0833 |
| 2018/0097590 A1 | 4/2018 | Ly | |
| 2018/0227805 A1 | 8/2018 | Jang | |
| 2019/0141742 A1* | 5/2019 | Zhou | H04L 5/0064 |
| 2019/0335515 A1 | 10/2019 | Chen | |
| 2019/0350004 A1 | 11/2019 | Zhao | |
| 2020/0077446 A1 | 3/2020 | Agiwal | |
| 2020/0100297 A1 | 3/2020 | Agiwal | |
| 2020/0107371 A1 | 4/2020 | Kunt | |
| 2020/0107372 A1* | 4/2020 | Agiwal | H04W 24/08 |
| 2020/0236716 A1* | 7/2020 | Lei | H04L 5/0044 |
| 2020/0252896 A1* | 8/2020 | Lei | H04W 74/0833 |
| 2020/0260500 A1* | 8/2020 | Agiwal | H04W 74/006 |
| 2020/0275505 A1* | 8/2020 | Lei | H04L 1/1825 |
| 2020/0288506 A1* | 9/2020 | Lei | H04W 74/0833 |
| 2020/0351947 A1* | 11/2020 | Lei | H04W 74/0833 |
| 2020/0396633 A1* | 12/2020 | Tseng | H04L 5/001 |
| 2020/0404711 A1 | 12/2020 | Zhao | |
| 2021/0007146 A1* | 1/2021 | Agiwal | H04W 74/0833 |
| 2021/0028905 A1* | 1/2021 | Lei | H04L 5/0044 |
| 2021/0037530 A1 | 2/2021 | Shih | |
| 2021/0037573 A1* | 2/2021 | Ly | H04W 72/23 |
| 2021/0051726 A1* | 2/2021 | Xu | H04W 76/27 |
| 2021/0100039 A1* | 4/2021 | Zhang | H04W 74/0833 |
| 2021/0168862 A1* | 6/2021 | Murray | H04W 74/002 |
| 2021/0259027 A1* | 8/2021 | Deogun | H04W 76/11 |
| 2022/0095379 A1* | 3/2022 | Xiong | H04W 74/0833 |
| 2022/0272276 A1 | 8/2022 | Murray | |
| 2022/0272760 A1* | 8/2022 | Murray | H04W 74/0833 |
| 2022/0312501 A1* | 9/2022 | Lei | H04L 1/1867 |

FOREIGN PATENT DOCUMENTS

| | | |
|---|---|---|
| EP | 3927095 | 12/2021 |
| WO | 2009038300 | 3/2009 |
| WO | 2018085726 | 5/2018 |
| WO | 2020191561 | 10/2020 |
| WO | 2021030618 | 2/2021 |
| WO | WO-2021030618 A1 * | 2/2021 ........... H04L 1/1812 |

OTHER PUBLICATIONS

Nokia et al. "Feature lead summary #3 on 2 step RACH procedures"; 3GPP TSG RAN WG1 #97 R1-1907900; May 13, 2019.
Email Discussion Rapporteur (ZTE); "Procedures and mgsB content [105bis#30][NR/2-step RACH]"; 3GPP TSG-EG2 Meeting #106 R2-1906308; Reno, May 13, 2019.
Office Action for CN Application for Invention No. 201910745594. 1; Feb. 5, 2024.
Extended European Search Report for EP 25150812.3; Apr. 9, 2025.
INTEL "Procedure for two-step RACH" 3GPP TSG RAN WG2 #105BIS R2-1904439; Apr. 8, 2019.

* cited by examiner

Example of MAC PDU including MAC RARs

Example of MAC PDU including MAC RARs

DOWNLINK RADIO RESOURCE CONTROL MESSAGE TRANSMISSION IN 2-STEP RANDOM ACCESS

PRIORITY CLAIM

This application is a continuation of U.S. application Ser. No. 17/573,413, entitled "Downlink Radio Resource Control Message Transmission in 2-Step Random Access" filed Jan. 11, 2022, which is a continuation of U.S. patent application Ser. No. 16/885,937, entitled "Downlink Radio Resource Control Message Transmission in 2-Step Random Access," filed May 28, 2020, now issued as U.S. Pat. No. 11,265,925, which claims priority to Chinese Patent Application serial number 201910745594.1, entitled "Downlink Radio Resource Control Message Transmission in 2-Step Random Access," filed Aug. 13, 2019, which are hereby incorporated by reference in their entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, and more particularly to apparatus, systems, and methods for performing 2-step random access.

DESCRIPTION OF THE RELATED ART

Wireless communication systems are rapidly growing in usage. Further, wireless communication technology has evolved from voice-only communications to also include the transmission of data, such as Internet and multimedia content. Random access procedures may typically include four messages (e.g., four steps, e.g., 4-step RA or 4-step RACH). Techniques for random access with two messages (e.g., 2-step RACH) are in development, however improvements in the field are desired.

SUMMARY

Embodiments relate to apparatuses, systems, and methods to perform transmission of downlink radio resource control (RRC) messages in context of a 2-step random access (RA) procedure, e.g., an RA procedure using two messages (e.g., two steps, e.g., instead of previous four step processes). Embodiments include techniques for transmitting a first downlink RRC message from a network to a wireless device. In some embodiments, the RRC message may be transmitted via a unicast (e.g., dedicated) transmission. In some embodiments, the RRC message may be transmitted via a group-cast transmission.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
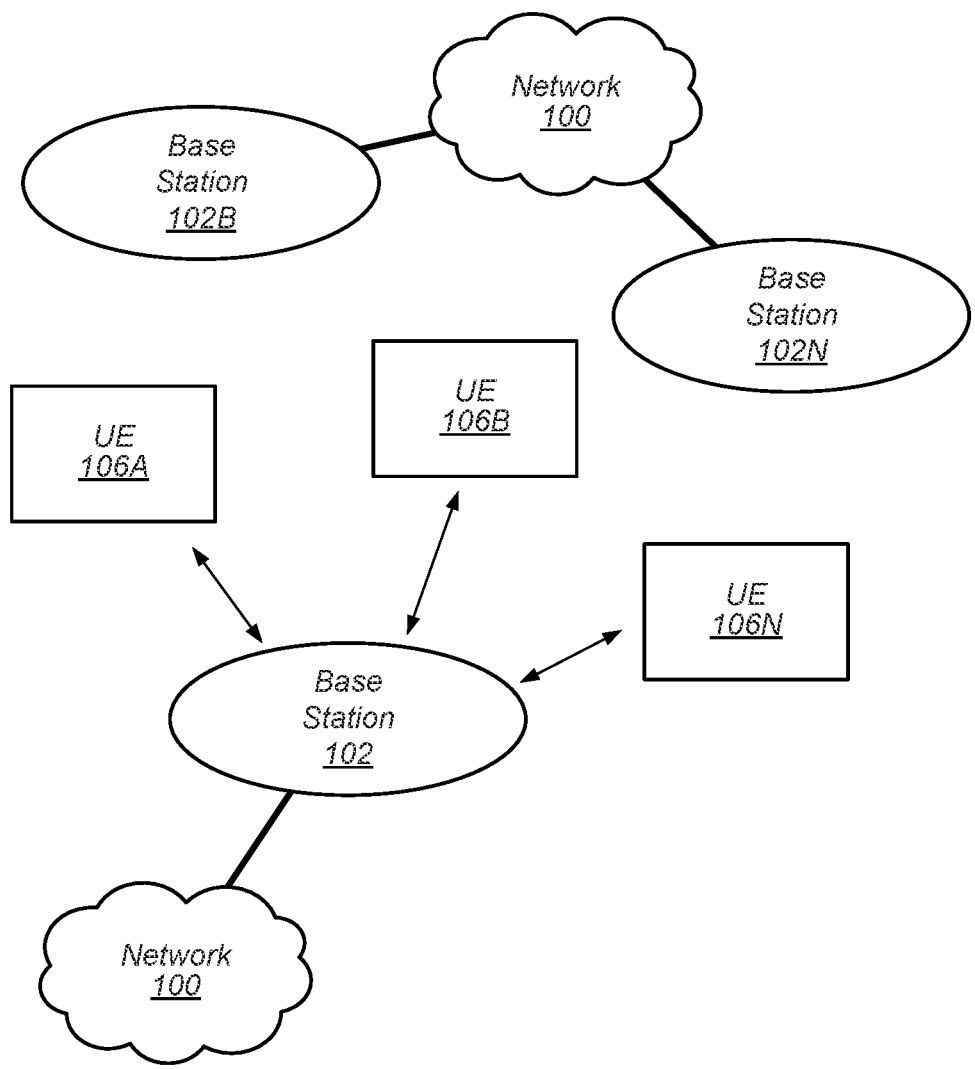
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")— any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
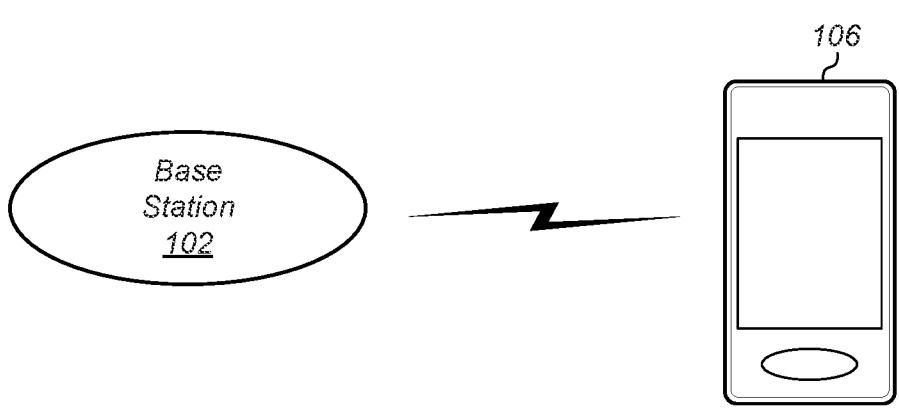
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
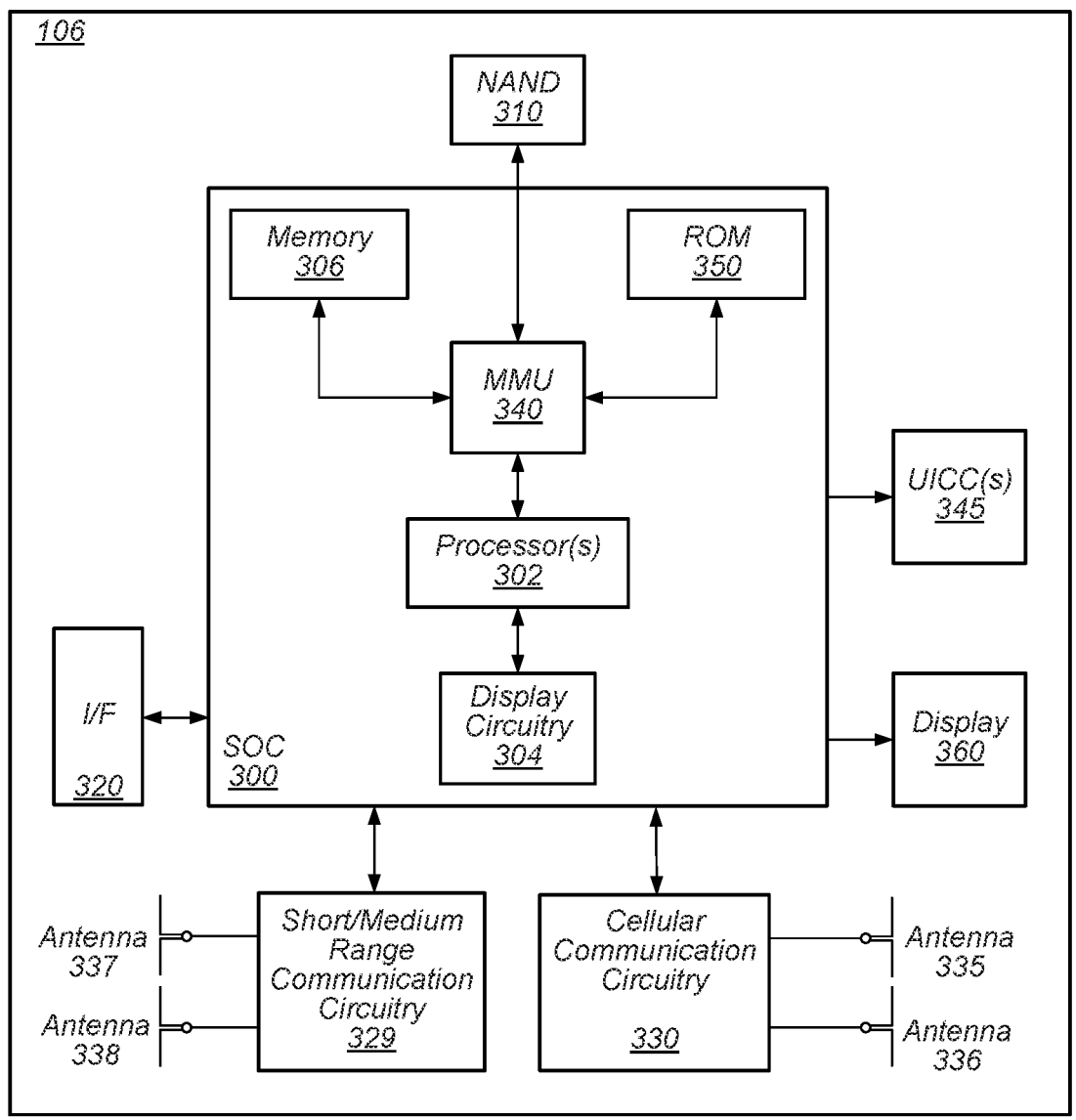
FIG. 3 illustrates an example block diagram of a UE, according to some embodiments.

FIG. 3— Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements/processors may be included in cellular communication circuitry 330 and, similarly, one or more processing elements/processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
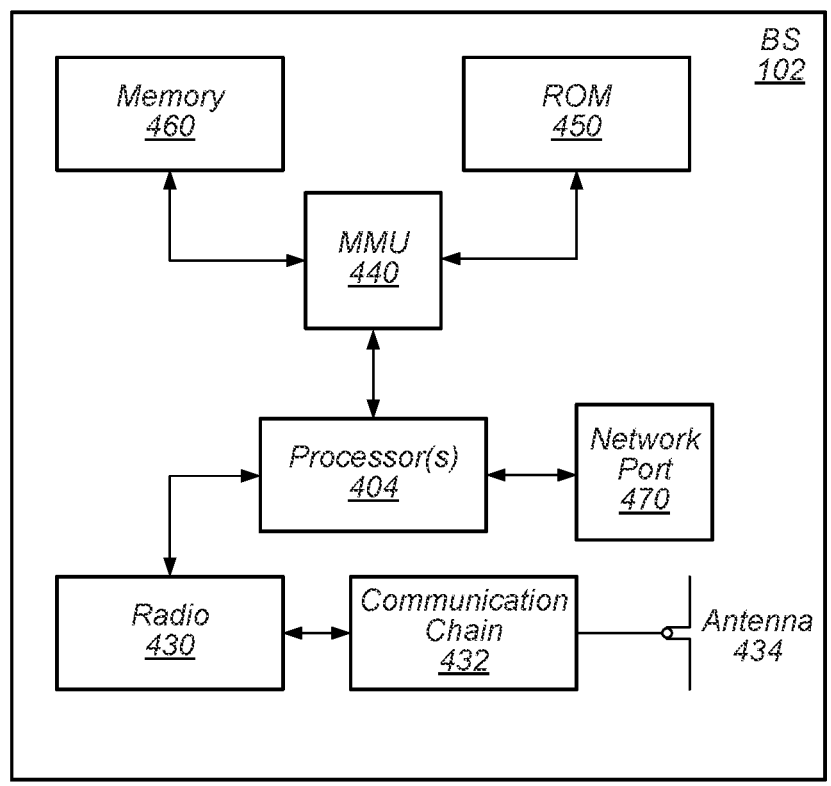
FIG. 4 illustrates an example block diagram of a BS, according to some embodiments.

FIG. 4— Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
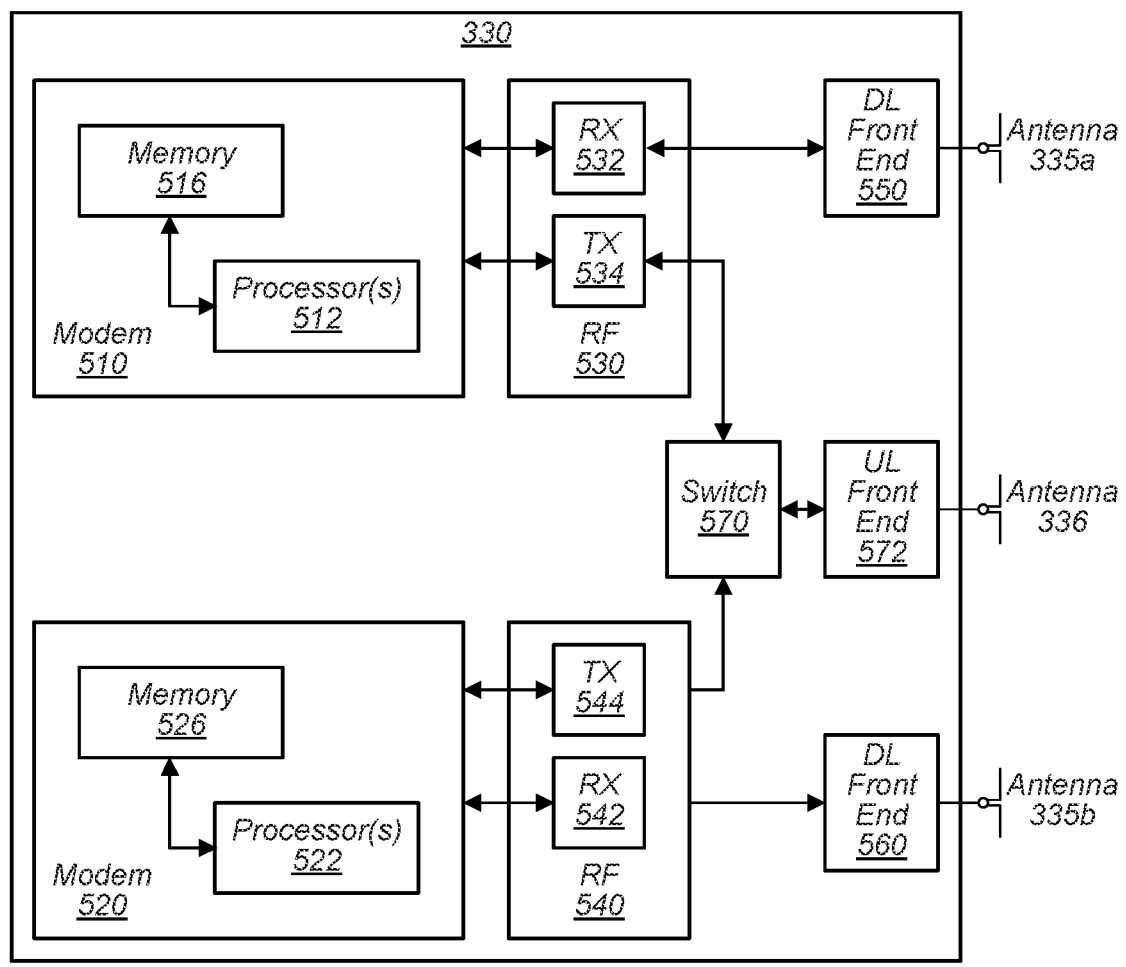
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition)

the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
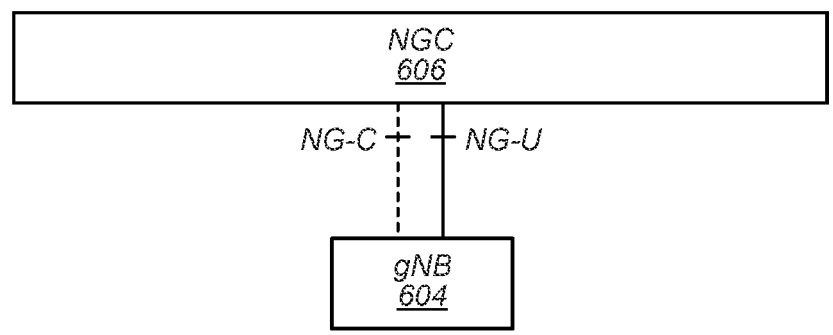
FIGS. 6 and 7 illustrate examples of a 5G NR base station (gNB), according to some embodiments.
Figure 7:
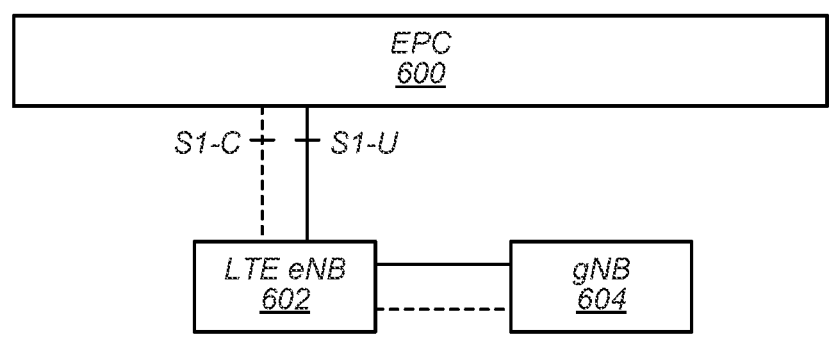

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
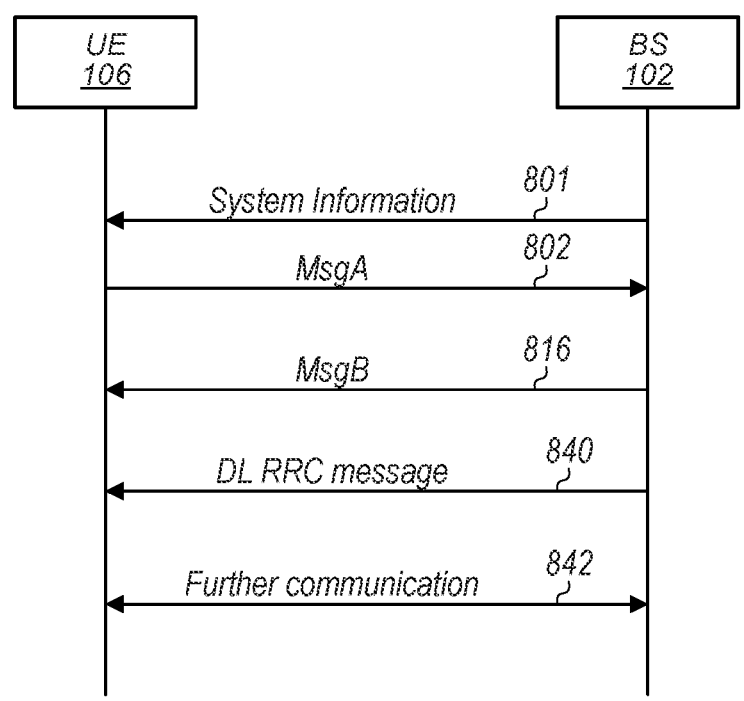
FIG. 8 illustrates techniques for transmitting a radio resource control message in the context of 2-step random access, according to some embodiments.

FIG. 8— Radio Resource Control (RRC) Messages in 2-Step Random Access

A 4-step random access (RA) procedure (e.g., random access channel (RACH)) may be used to initiate, resume, setup, or reestablish a connection (e.g., a radio resource control (RRC) connection) between a UE and a BS, e.g., in LTE. Newer wireless standards, e.g., NR, may seek to reduce latency and/or signaling overhead by using a 2-step RA procedure, under at least some circumstances. However, various features of 2-step RA procedures have not yet been determined. For example, downlink (DL) radio resource control (RRC) message transmission procedures are not currently resolved for 2-step RA procedures.

FIG. 8 is a communication flow diagram which illustrates exemplary techniques for performing transmission of DL RRC messages and/or other connection configuration messages in association with 2-step RA. Aspects of the method of FIG. 8 may be implemented by a network including one or more base stations (e.g., BS 102) in communication with one or more wireless device, such as the UE(s) 106, as illustrated in and described with respect to the Figures, or more generally in conjunction with any of the computer circuitry, systems, devices, elements, or components shown in the Figures, among other devices, as desired. For example, a processor (or processors) of the UE (e.g., processor(s) 302, processor(s) associated with communication circuitry 329 or 330 such as processor(s) 512 and/or 522, etc.), base station (e.g., processor(s) 404, or a processor associated with radio 430 and/or communication chain 432, among various possibilities), or network element (e.g., any component of NGC 606, EPC 600, etc.) may cause the UE or base station to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. Further, the method may be applied in other contexts (e.g., between multiple UEs, e.g., in device-to-device communications). In various embodiments, some of the elements of the methods shown may be performed concurrently, in a different order than shown, may be substituted for by other method elements, or may be omitted. Additional method elements may also be performed as desired. As shown, the method may operate as follows.

A BS 102 may transmit system information about a network, e.g., a cellular network, according to some embodiments (802). A user equipment device (e.g., UE 106) may detect the network, e.g., based on the system information. The UE may determine configuration information related to performing random access (RA) with the network. For example, the BS may broadcast and the UE may receive one or more system information blocks (SIB) such as SIB1 transmitted by the BS which may include the RA configuration information. The RA configuration information may include condition configuration information and/or RA procedure configuration information, among various possibilities. The RA configuration information may apply to 2-step RA and/or 4-step RA.

The RA procedure configuration information may indicate resources and/or a transmission scheme (e.g., or schemes) for a downlink RRC message or messages and/or other connection configuration message(s), e.g., which may be transmitted by the BS to the UE based on a successful RA procedure. For example, the RA procedure configuration information may indicate any of the various transmission schemes described herein, e.g., with respect to 840 below and/or subsequent Figures.

The RA procedure configuration information may indicate resources (e.g., time and/or frequency resources on a physical random access channel (PRACH)) for use for transmitting and receiving RA messages. The RA configuration may identify resources for any of various RA messages, including message 1 (Msg1), Msg2, Msg3, Msg4, MsgA, and/or MsgB. Msg1-Msg4 (described with reference to, for example, FIG. 9) may be useful for 4-step RA and MsgA and MsgB (described with reference to, for example, FIG. 10) may be useful for 2-step RA.

Based on the RA procedure configuration and/or other factors (e.g., application traffic activity, measurements, etc.) the UE 106 may determine to perform a 2-step RA procedure and may transmit a MsgA to the BS 102 (802), according to some embodiments. The MsgA may utilize a preamble according to the RA configuration information. The MsgA may also include control information. MsgA is further described below with respect to FIG. 10.

In response to the MsgA, the BS 102 may transmit MsgB to the UE 106 (816), according to some embodiments. The MsgB may include a response to the MsgA. Such a response to MsgA (e.g., a random access response (RAR)) may include: an indication of success, an indication to fallback to a 4-step RA procedure (e.g., in response to MsgA being incompletely received by the BS 102), and/or a backoff indication (e.g., signaling the UE to attempt random access again). MsgB is further described below with respect to FIG. 10.

The BS 102 may transmit a downlink (DL) RRC message and/or other connection configuration message(s) to the UE 106 (840), according to some embodiments. The BS 102 may transmit the connection configuration message(s) to the UE in a manner indicated in the RA configuration information. For example, the BS may transmit the message(s) using time and frequency resources consistent with an indication transmitted as system information. The UE 106 may determine the time and frequency resources to receive the connection configuration message(s) according to such RA configuration information or other system information.

The DL RRC message may be an RRC setup message, among various possibilities. More generally, the connection configuration message may indicate to the UE one or more parameters or settings to configure the connection between the UE and the BS 102. The DL RRC message and/or other connection configuration message(s) may be transmitted subsequent to MsgB or concurrently with MsgB (e.g., multiplexed with MsgB), among other possibilities.

According to various embodiments, the DL RRC message and/or other connection configuration message(s) may be group-cast (e.g., multiple respective messages to corresponding respective UEs may be multiplexed together) or may be unicast (e.g., a message may be sent to an individual UE using a dedicated transmission).

In the case of a unicast transmission, the DL RRC message and/or other connection configuration message(s) may be transmitted under any of the following conditions, among various possibilities. The BS 102 may transmit the message after receiving an acknowledgement (e.g., ACK) from the UE of MsgB, e.g., indicating successful reception of MsgB. The BS 102 may transmit the message without (e.g., or prior to) receiving such an ACK. The BS 102 may transmit the message according to a DL resource assignment that may be included in MsgB or transmitted at a fixed time, among various possibilities. In some embodiments, the DL resource assignment may be indicated in a PDCCH. The BS 102 may transmit the message at a fixed time (e.g., a certain period of time after transmitting the MsgB or a certain period of time after receiving MsgA). For example, the time and frequency resources used for transmission of the DL RRC message and/or other connection configuration message(s) may be indicated in RA configuration information. A unicast (e.g., dedicated) transmission of the message (e.g., according to any of the options described herein) may provide for HARQ acknowledgement (e.g., and retransmission, if needed) of the message.

Figure 15:
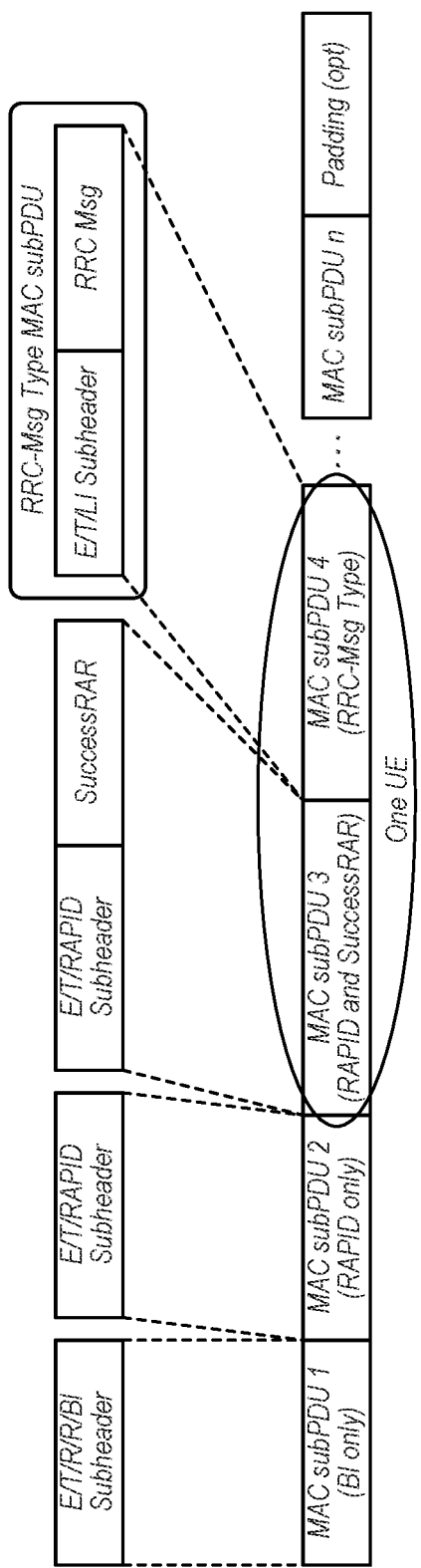
Figure 16:
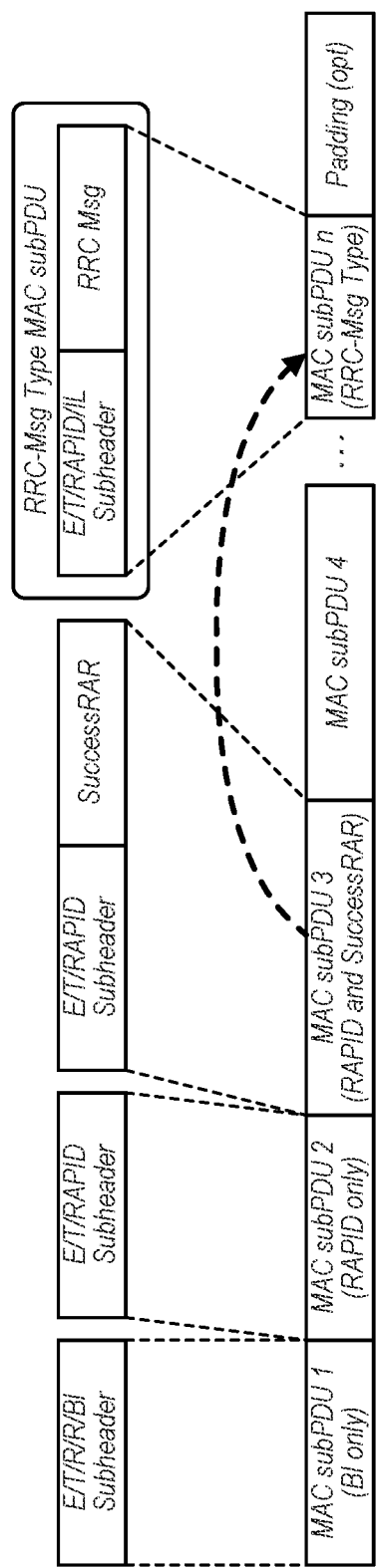

In the case of a group-cast transmission, the BS 102 may transmit the message multiplexed with responses to MsgA included in MsgB. In other words, MsgB may be multiplexed with the DL RRC message and/or other connection configuration message(s) to various UEs. For example, each response indicating successful random access may optionally include a corresponding DL RRC message and/or other connection configuration message. As another example, a new type of media access control (MAC) sub protocol data unit (subPDU) may be introduced to include the DL RRC message and/or other connection configuration message, e.g., an RRC-Msg MAC subPDU. The RRC-Msg MAC subPDU may be next to (e.g., successively follow, e.g., as illustrated in FIG. 15) a corresponding response or may be located after all responses (e.g., as illustrated in FIG. 16).

Retransmission of such multiplexed configuration messages may be handled by RACH retransmission, e.g., started from MsgA. In other words, if the UE does not successfully receive the DL RRC message and/or other connection configuration message, the UE may restart the RA process by transmitting (e.g., retransmitting) MsgA. Alternatively, the UE may fallback to 4-step RA, e.g., by transmitting Msg3.

In another example of group-cast transmission, the BS 102 may transmit a dedicated MAC PDU including the DL RRC message and/or other connection configuration messages for any number of UEs. For example, the BS may transmit a dedicated RRC-msg type MAC PDU, e.g., subsequent to transmission of corresponding MsgB for the UE(s). In such a dedicated MAC PDU any number of configuration messages (e.g., RRC-Msg MAC subPDUs) may be concatenated. Such a message may be scheduled via RA-RNTI. Retransmission may be scheduled via T-C-RNTI, e.g., as allocated in MsgB-RAR.

Figure 9:
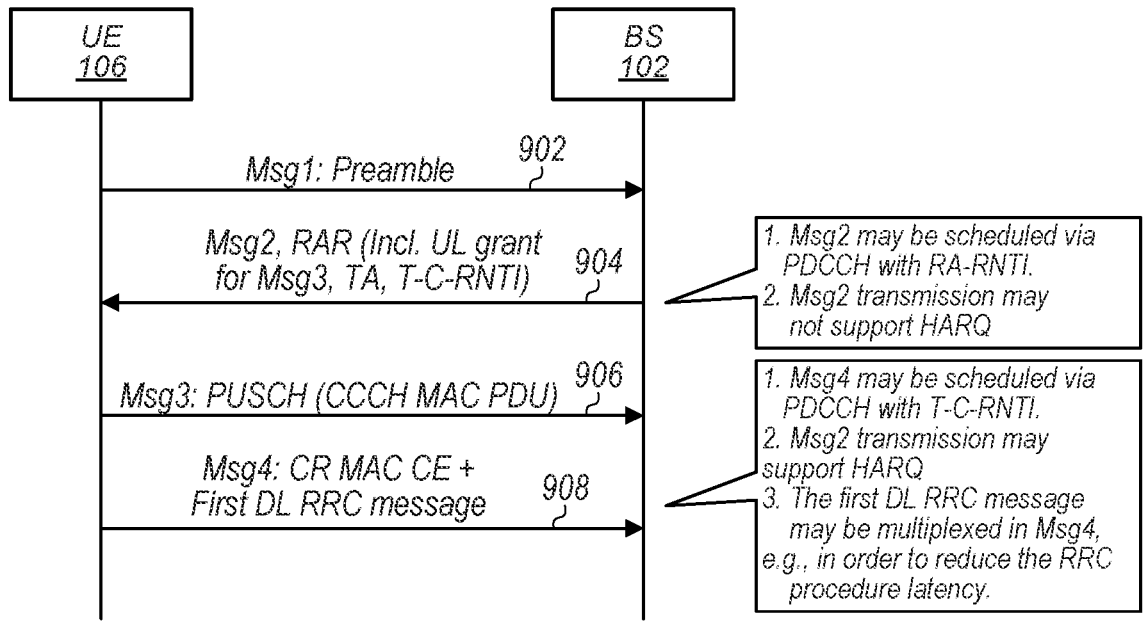
FIG. 9 illustrates aspects of an exemplary 4-step random access procedure, according to some embodiments.

FIGS. 9—4-Step Random Access

FIG. 9 illustrates aspects of 4-step RA, according to some embodiments. A UE (e.g., UE 106) may transmit a RA preamble to a gNB (e.g., BS 102) (902). The preamble may be referred to as Msg1 (e.g., message 1). Physical RA channel (PRACH) resource/preamble may be configured via system information block 1 (SIB1) or RRC dedicated signaling. Multiple preambles may be transmitted on one PRACH resource. The UE may select the PRACH occasion and preamble for Msg1 transmission.

The BS 102 may respond to the preamble with a RA response (RAR) (904). The RAR may be referred to as Msg2. Msg2 may be transmitted using a RA radio network temporary identifier (RA-RNTI) associated with the PRACH occasion in which the preamble is transmitted. In other words, the Msg2 may be scheduled via a physical downlink control channel (PDCCH) with the RA RNTI.

In some embodiments, the RA-RNTI may be calculated based on various factors such as: a symbol index (e.g., the index of the first OFDM symbol of the PRACH occasion, a slot index (e.g., the index of the first slot of the PRACH occasion in a system frame, a frequency index (e.g., the index of the PRACH occasion in the frequency domain, and an index of the carrier used for transmitting the preamble. The UE may monitor the physical downlink control channel (PDCCH) masked by RA-RNTI within a RAR window (e.g., from the time of the transmission of the preamble).

Based on detecting its preamble (e.g., RAPID) in the RAR, the UE may consider Msg2 reception successful.

Msg2 may include: an uplink (UL) grant for Msg3, a timing advance (TA) command, and a temporary cell radio network temporary identifier (T-C-RNTI). The TA command may serve to synchronize the UE and the network.

In some embodiments, Msg2 transmission may be groupcast and scheduled by RA-RNTI. In other words, the BS 102 may multiplex RAR for multiple UEs in a single message (e.g., a MAC PDU containing respective subPDUs for each of multiple respective UEs). Thus, Msg2 may not be configured to support retransmissions, e.g., via hybrid automatic repeat request (HARQ).

The UE may respond to the RAR with a scheduled transmission (906). The scheduled transmission may be referred to as Msg3. The UE may transmit Msg3 according to the UL grant in the RAR (e.g., in Msg2). The UE may monitor PDCCH masked by T-C-RNTI for potential Msg3 retransmission (e.g., for an indication from the BS to retransmit Msg3).

In some embodiments, the Msg3 may include a logical channel identifier (LCID) and a common control channel (CCCH) service data unit (SDU) and/or a media access control (MAC) protocol data unit (PDU), among various possibilities.

The BS 102 may respond to Msg3 with a contention resolution (CR) (908). The CR (e.g., a CR MAC control element (CE)) may be referred to as Msg4. In some embodiments, Msg4 may also include a first DL RRC message, e.g., in addition to the CR. In other words, the DL RRC message may be multiplexed in Msg4.

The BS 102 may transmit Msg4 via a unicast transmission (e.g., a transmission dedicated to an individual UE). The unicast transmission may be scheduled by T-C-RNTI and may support HARQ retransmission, according to some embodiments. A UE may monitor PDCCH masked by T-C-RNTI and/or C-RNTI. If a CR is received the RA procedure may be a success.

The (e.g., first) DL RRC message may include any of: RRC reject, RRC setup, RRC reestablishment, and/or RRC resume messages, among various possibilities. Including the DL RRC message with the Msg4 may reduce the latency of the RRC procedure (e.g., may enable the UE to receive the RRC message and perform RRC configuration sooner relative to a case in which the DL RRC message is transmitted subsequent to the Msg4).

Following reception of the first RRC message, the UE may operate as indicated in the RRC message.

Figure 10:
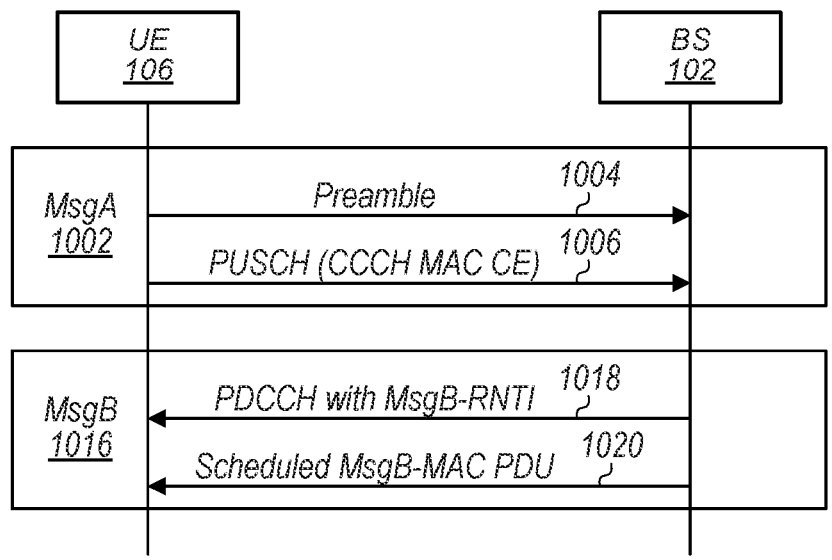
FIGS. 10 and 11 illustrate aspects of an exemplary 2-step random access procedure, according to some embodiments.

FIGS. 10—2-Step Random Access Procedure

FIG. 10 illustrates an exemplary 2-step RA procedure, e.g., for initial access, according to some embodiments. A 2-step RA procedure may include MsgA (e.g., similar to Msg1 combined with Msg3) and MsgB (e.g., similar to Msg2 combined with Msg4).

A UE (e.g., UE 106) may transmit MsgA to a BS (e.g., BS 102) (1002). The MsgA may include a preamble (1004) and a CCCH MAC CE transmitted on a PUSCH (1006). The preamble and MAC PDU may be transmitted concurrently or sequentially (e.g., with or without a time interval in between the transmissions) on one or more frequencies. Based on determining to perform a 2-step RA procedure, the UE may select the next available PRACH resource, and may (e.g., randomly) select a preamble for transmission of MsgA (1002).

After transmitting MsgA, the UE may start monitoring for MsgB within a 2-step RAR window. The 2-step RAR window may be determined based on received RA configuration information, network configuration, definitions in a standard, etc. The BS may respond with a MsgB (1016), e.g., during the RAR window. MsgB may indicate success or fallback in the RAR. MsgB may multiplex RAR for multiple UEs. MsgB may include a PDCCH transmitted with a MsgB-RNTI (1018) and a MsgB-MAC PDU (1020). The MsgB-RNTI may be determined based on various factors such as: a symbol index (e.g., the index of the first OFDM symbol of the PRACH occasion, a slot index (e.g., the index of the first slot of the PRACH occasion in a system frame, a frequency index (e.g., the index of the PRACH occasion in the frequency domain, and an index of the carrier used for transmitting the preamble, and potentially the PUSCH info used by MsgA. The MsgB-MAC PDU may be scheduled according to a DL grant included in the PDCCH. The MsgB-MAC PDU may include the RAR.

In some embodiments, a SuccessRAR (e.g., an RAR indicating that the RA procedure is successful (e.g, MsgA received successfully by the BS) and that the UE may access the network) may include a contention resolution (CR) identifier (ID), C-RNTI, and a TA command. The CR ID may be used as an identifier for the UE, e.g., to resolve the contention(s) and assist a UE in determining whether an RAR is directed to itself. In some embodiments, a Fallback-RAR (e.g., an RAR indicating that the MsgA was not successfully or completely received by the BS, and that the UE should fallback to a 4-step RA procedure) may include: a RA preamble identifier (RAPID) (e.g., for the failed MsgA), a UL grant (e.g., for Msg3 transmission), T-C-RNTI, and a TA command. MsgB may additionally or alternatively include a backoff indicator (BI), e.g., to indicate to one or more UEs to attempt MsgA again after a backoff period.

FIG. 11—MsgB

Figure 11:
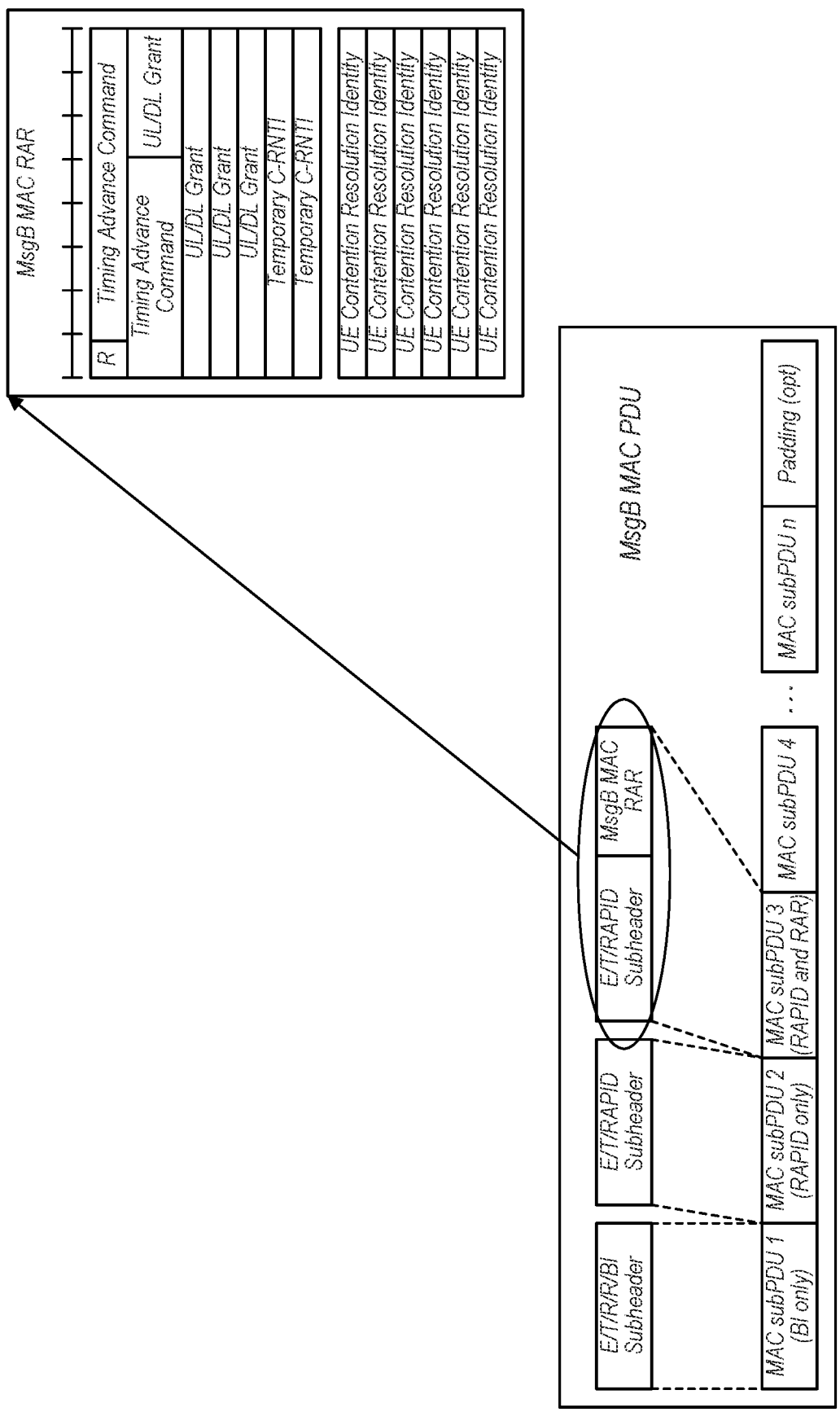

FIG. 11 illustrates a MsgB MAC PDU, according to some embodiments. The BS may transmit a MAC PDU consisting of one or more MAC subPDUs. Each subPDU may include a subheader indicating whether the subPDU includes backoff indication (BI), a RA preamble (RAPID), and/or a RAR. In the illustrated example, subPDU 3 may include a MAC RAR, e.g., for a first UE 106. MAC subPDUs 4-n may include RARs for additional UEs. The exemplary, illustrated MsgB MAC RAR may include 13 octets. The first octet may include R (e.g., a reserved bit) and a timing advance (TA) command. The TA command may serve to synchronize the UE and the network. The second octet may include the remainder of the TA command and a portion of a grant, e.g., for UL and/or DL resources. The remainder of the grant may be included in octets 3-5. The 6th and 7th octets may include a temporary cell radio network temporary identifier (T-C-RNTI). The remaining octets may include a UE CR ID. Based on detecting its preamble (e.g., RAPID) in the RAR, the UE may consider MsgB reception successful and may apply the timing advance value from the TA command for UL synchronization with the network.

Figure 12:
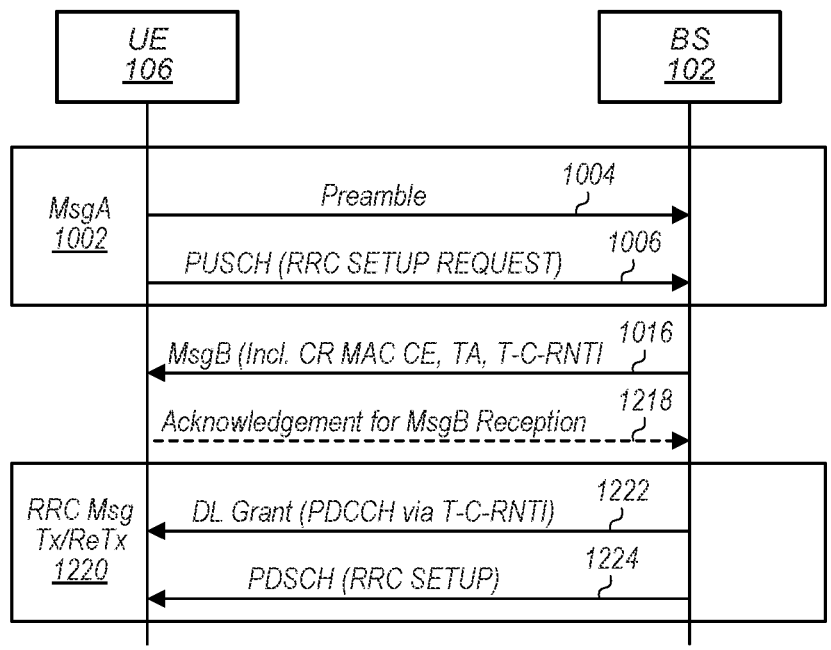
FIGS. 12 and 13 illustrate aspects of transmitting a radio resource control message using a dedicated transmission, according to some embodiments.
Figure 13:
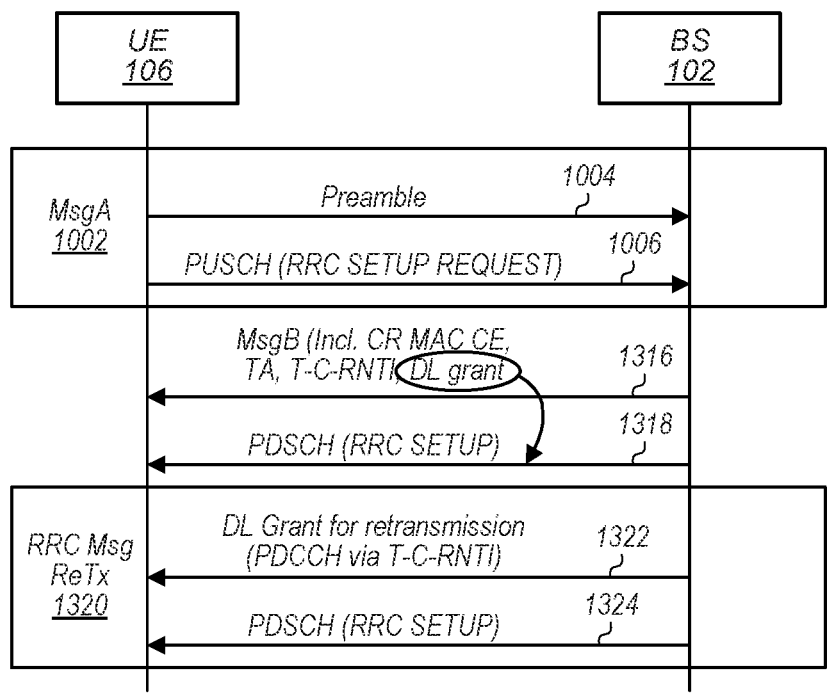

FIGS. 12 and 13— Transmitting an RRC Message Using a Dedicated Transmission FIGS. 12 and 13 are communication flow diagrams illustrating exemplary processes for transmitting a first DL RRC message using a dedicated (e.g., unicast) transmission, according to some embodiments.

FIG. 12 illustrates examples in which the network sends (e.g., the BS 102 transmits) the first DL RRC message via a dedicated transmission separate from MsgB, according to some embodiments. Transmission of MsgA and MsgB may operate as illustrated in FIG. 10 and described with respect to 1002, 1004, 1006, and 1016 (e.g., including 1018 and 1020).

In some embodiments, the UE may transmit an acknowledgement (ACK) of the MsgB (1218), and the BS may receive the acknowledgement.

The BS may transmit the RRC message to the UE (1220). In some embodiments, transmitting the RRC message may be responsive to receiving the acknowledgement of MsgB. In some embodiments, transmitting the RRC message may be responsive to expiration of a timer (e.g., the RRC message may be transmitted a certain amount of time after transmission of MsgB.

Transmitting the RRC message to the UE may include transmitting a DL grant (1222) to the UE. The DL grant may be transmitted on PDCCH resources according to T-C-RNTI. Transmitting the RRC message to the UE may also include transmitting an RRC setup message (1224) to the UE. The RRC setup message may be transmitted on resources indicated in the DL grant, e.g., via PDSCH. It will be appreciated that HARQ retransmission may be applicable to the DL grant and RRC setup message; accordingly, 1220, 1222, and/or 1224 may be repeated, if necessary (e.g., in response to a NACK or if no ACK is received).

FIG. 13 illustrates examples in which the network sends (e.g., the BS 102 transmits) the first DL RRC message via a dedicated transmission scheduled by MsgB, according to some embodiments. Transmission of MsgA may operate as illustrated in FIG. 10 and described with respect to 1002, 1004, and 1006. Transmission of MsgB may be similar to 1016, 1018, and 1020, however a DL grant may be included in the successRAR of MsgB (1316). In other words, the MsgB-MAC PDU described above with respect to 1020 and FIG. 11 may include a DL grant which identifies DL resources for the first DL RRC message. The first DL RRC message may be an RRC setup message transmitted on PDSCH resources identified by the DL grant (1318). As noted above, HARQ retransmission may be applicable to the DL grant and RRC setup message; accordingly, retransmission (e.g., 1320, 1322, and/or 1324) may occur, if necessary (e.g., in response to a NACK or if no ACK is received). It will be appreciated that retransmission may not be needed and may not occur in some cases.

FIGS. 14-18 Transmitting an RRC Message Using a Group-Cast Transmission

FIGS. 14-18 illustrate aspects of exemplary processes for transmitting a first DL RRC message using a non-dedicated (e.g., group-cast or multi-cast) transmission, according to some embodiments.

Figure 14:
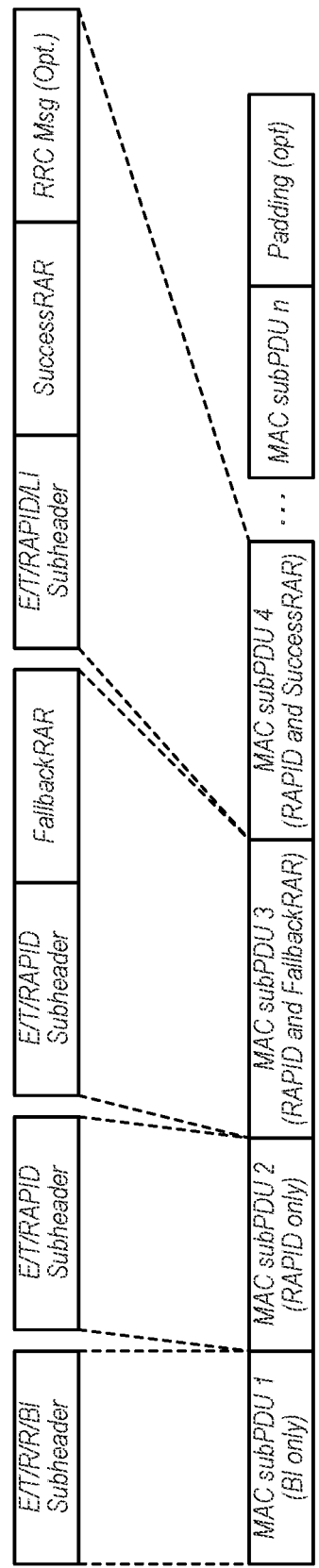
FIGS. 14-18 illustrate aspects of transmitting a radio resource control message using a group-cast transmission, according to some embodiments.

FIGS. 14-16 illustrate exemplary MAC PDUs, each including a plurality of MAC RARs, according to some embodiments. Such a MAC PDU may be transmitted in MsgB. The MAC PDUs of FIG. 14-16 may be similar to that of FIG. 11, in some regards. For example, each subPDU may include a header. Further, a plurality of subPDUs may include respective RARs (e.g., indicating success or failure of the RA process) for respective UEs.

As shown in FIG. 14, a MAC PDU or subPDU including a successRAR (e.g., subPDU 4, in the example) may optionally include an RRC message or other connection configuration message. The subheader of the subPDU may indicate whether or not a DL RRC message and/or other connection configuration message(s) is included in the subPDU. The subheader of the subPDU may include a length indicator (LI). The LI may indicate the length of the subPDU. Based on the LI, a UE 106 may determine whether or not an RRC message is included in the subPDU and/or may determine the length of the RRC message if one is included. A MAC subPDU including a fallbackRAR may not include an RRC message. For example, a MAC PDU may include some subPDUs which indicate successful random access attempts and other subPDUs which indicate RA failure (e.g., fallback RAR). The subPDUs indicating success may include respective RRC messages and the subPDUs indicating RA failure may not include RRC messages, according to some embodiments.

FIGS. 15 and 16 illustrate exemplary MAC PDUs which may include new MAC subPDU types, introduced to include an RRC message multiplexed with RAR in MsgB, according to some embodiments. FIG. 15 illustrates that an RRC message MAC sub PDU (e.g., RRC-Msg Type MAC subPDU) may be next to (e.g., may immediately follow) a subPDU with an associated successRAR. Thus, in the illustrative example, subPDU 3 may include a successRAR for a first UE and subPDU 4 may include a subPDU of a new type including the RRC message. As shown, the new type of subPDU may include a subheader followed by the RRC message. In some embodiments, the subheader may not include the RAPID, e.g., because the RAPID of the corresponding successRAR PDU may identify the UE for which the RRC message is intended. The intended UE may determine that the subPDU following its successRAR is directed to it, and may therefore receive and decode the RRC-Msg MAC subPDU corresponding to its RAPID.

FIG. 16 illustrates that an RRC message MAC sub PDU (e.g., RRC-Msg Type MAC subPDU) may follow all RAR type MAC subPDUs. Thus, in the illustrative example MAC subPDU3 may include a successRAR for a first UE. MAC subPDU3 may be followed by any number of subPDUs containing RARs for other UEs and/or RRC messages for other UEs. MAC subPDU n may be an RRC-Msg type subPDU for the first UE (e.g., corresponding to MAC subPDU 3). The RRC-Msg type subPDU may be identified by a RAPID in the subheader and, based on the RAPID, a UE may determine whether it is the UE for which the RRC-Msg type subPDU is intended. Any number of RRC-Msg type subPDUs may be included in a MsgB MAC PDU.

Figure 17:
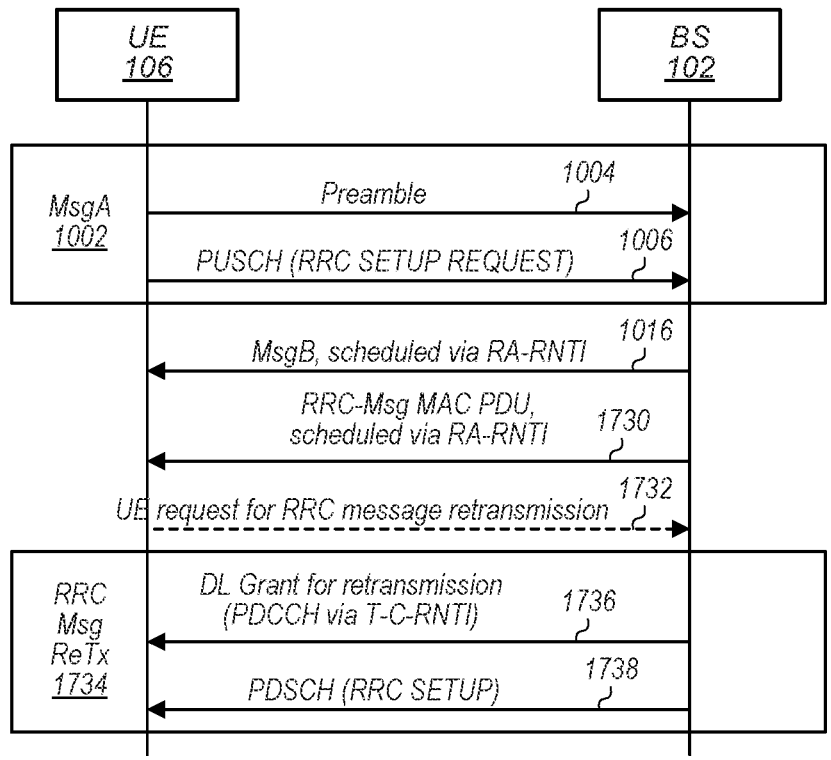
Figure 18:
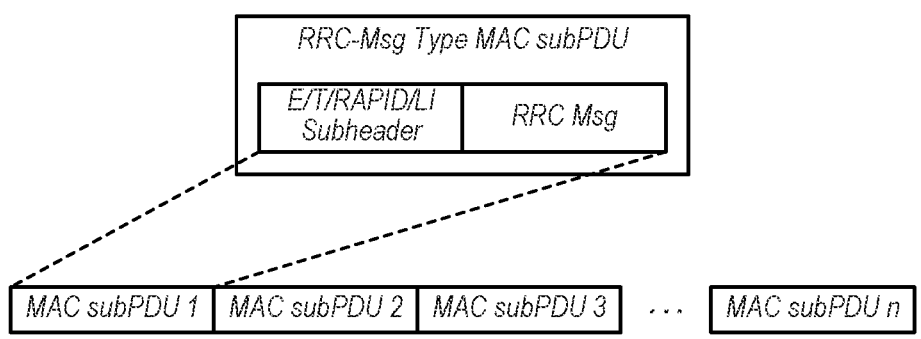

FIG. 17 is a communication flow diagram illustrating a 2-step RA process and transmission of a dedicated MAC PDU including RRC messages for one or more UEs (e.g., an RRC-Msg MAC PDU), according to some embodiments. Transmission of MsgA and MsgB may operate as illustrated in FIG. 10 and described with respect to 1002, 1004, 1006, and 1016 (e.g., including 1018 and 1020). Following transmission of MsgB, the BS 102 may transmit an RRC message MAC PDU (1730). The RRC message MAC PDU may be scheduled via RA-RNTI. RRC messages for any number of UEs may be concatenated together in the MAC PDU as illustrated in FIG. 18. For example, respective subPDUs may include RRC messages for corresponding respective UEs. It will be appreciated that the RRC-Msg MAC PDU may include RRC setup messages for any number (e.g., one or more) of UEs.

A UE may consider the RA process to be a success based on receiving the MsgB, e.g., regardless of whether the RRC-Msg MAC PDU is received. In the event that the RRC-Msg MAC PDU is not received, a UE may request retransmission (1732), e.g., the UE may send a negative acknowledgement (NACK). In response to such a request, the BS may perform retransmission of the RRC-Msg MAC PDU (1734), including sending a DL grant (e.g., using PDCCH scheduled by T-C-RNTI) (1736) and may resend the (e.g., UE-specific) RRC setup message on PDSCH resources according to the DL grant (1738). It will be appreciated that retransmission may not be performed in some cases, e.g., when the initial RRC-Msg MAC PDU is received by the UE(s).

Additional Information and Examples

In the following, exemplary embodiments are provided.

Another exemplary embodiment may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Yet another exemplary set of embodiments may include a 5G NR network node or base station configured to perform any action or combination of actions as substantially described herein in the Detailed Description and/or Figures.

Yet another exemplary set of embodiments may include a 5G NR network node or base station that includes any component or combination of components as described herein in the Detailed Description and/or Figures as included in a mobile device.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for operating a base station, the method comprising:
    transmitting random access configuration information for 2-step random access;
    receiving, from first and second user equipment devices (UEs), first and second initial messages of 2-step random access, MsgA, according to the random access configuration information; and
    transmitting, in response to the first and second initial messages of 2-step random access, MsgA:
        a first response message for the first UE, the first response message including a fallback random access response (RAR); and
        a second response message for the second UE, the second response message including:
            a first sub protocol data unit (subPDU), of a protocol data unit (PDU), the first subPDU comprising a success RAR and a subheader indicating that a downlink (DL) radio resource control (RRC) message is included in the second response message; and
            a second subPDU of the PDU including the DL RRC message, wherein the second subPDU successively follows the first subPDU.

2. The method of claim 1, wherein the subheader does not include a random access preamble ID (RAPID) field.

3. The method of claim 2, wherein the success RAR includes the RAPID field.

4. The method of claim 1, wherein the DL RRC message comprises an RRC setup message.

5. The method of claim 1, wherein the DL RRC message follows all RAR messages in a MsgB.

6. The method of claim 1, further comprising:
    determining that a respective one of the first or second UEs did not receive a respective one RAR message; and
    performing a retransmission of the respective one RAR message.

7. The method of claim 1, wherein the PDU is scheduled by random access radio network temporary identifier (RA-RNTI).

8. A method for operating a user equipment device (UE), the method comprising:
    receiving random access configuration information for 2-step random access;
    transmitting an initial message of 2-step random access, MsgA, according to the random access configuration information; and
    receiving a response message including:
        a first sub protocol data unit (subPDU), of a protocol data unit (PDU), the first subPDU comprising a success RAR and a subheader indicating that a downlink (DL) radio resource control (RRC) message is included in the response message; and
        a second subPDU of the PDU including the DL RRC message, wherein the second subPDU successively follows the first subPDU.

9. The method of claim 8, wherein the subheader does not include a random access preamble ID (RAPID) field.

10. The method of claim 9, wherein the success RAR includes the RAPID field.

11. The method of claim 8, wherein the DL RRC message comprises an RRC setup message.

12. The method of claim 8, wherein the DL RRC message follows all RAR messages in a MsgB.

13. The method of claim 8, wherein the PDU is scheduled by random access radio network temporary identifier (RA-RNTI).

14. An apparatus, comprising:
a processor configured to cause a base station to:
transmit random access configuration information for 2-step random access;
receive, from at least a first user equipment device (UE), at least one first message (MsgA) of the 2-step random access according to the random access configuration information; and
transmit a MsgB in response to the at least one first message (MsgA), the MsgB including a first sub protocol data unit (subPDU) of the MsgB including a success random access response (successRAR) for the first UE and immediately followed by a second subPDU including a radio resource control (RRC) message for the first UE, wherein the first subPDU includes a first subheader in addition to the successRAR.

15. The apparatus of claim 14, wherein the first subheader indicates whether the first subPDU includes backoff indication.

16. The apparatus of claim 14, wherein the RRC message is scheduled by a random access radio network temporary identifier (RA-RNTI).

17. The apparatus of claim 14, wherein the first subPDU does not include an RRC message.

18. The apparatus of claim 14, wherein the RRC message comprises an RRC setup message.

19. The apparatus of claim 14, wherein the RRC message follows all random access response (RAR) messages in the MsgB.

20. The apparatus of claim 14, wherein the processor is further configured to cause the base station to:
determine that a second UE did not receive a corresponding random access response (RAR) message; and
perform a retransmission of the corresponding RAR message.

* * * * *